United States Patent
Wyrembek et al.

(10) Patent No.: US 7,316,371 B2
(45) Date of Patent: Jan. 8, 2008

(54) METHOD AND DEVICE FOR STEEPENING A LANDING APPROACH OF AN AIRCRAFT

(75) Inventors: Susanne Wyrembek, Delmenhorst (DE); Peter May, Bremen (DE); Klaus Muthreich, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 237 days.

(21) Appl. No.: 10/313,052

(22) Filed: Dec. 6, 2002

(65) Prior Publication Data

US 2003/0106961 A1    Jun. 12, 2003

(30) Foreign Application Priority Data

Dec. 7, 2001    (DE) .............................. 101 60 315

(51) Int. Cl.
*B64C 5/06*    (2006.01)
(52) U.S. Cl. ................... 244/91; 244/199.3; 244/199.4
(58) Field of Classification Search ............... 244/199, 244/91, 46, 198, 183, 110 D, 113, 119
See application file for complete search history.

(56) References Cited

U.S. PATENT DOCUMENTS

| | | | |
|---|---|---|---|
| 1,987,050 A * | 1/1935 | Burnelli | |
| 2,194,596 A * | 3/1940 | Henter | |
| 2,418,301 A * | 4/1947 | Heal | |
| 2,480,040 A * | 8/1949 | Mitchell | ...................... 244/87 |
| 2,649,265 A * | 8/1953 | Grant | |
| 2,697,568 A * | 12/1954 | Powers | |
| 2,816,724 A * | 12/1957 | Snodgrass | |
| 2,846,165 A * | 8/1958 | Axelson | |
| 3,270,988 A | 9/1966 | Cone, Jr. | |
| 3,406,929 A * | 10/1968 | Young | |
| 4,042,197 A * | 8/1977 | Boyle et al. | |
| 4,172,574 A | 10/1979 | Spillman | |
| 4,457,479 A * | 7/1984 | Daude | ........................ 244/203 |
| 4,477,042 A | 10/1984 | Griswold, II | |
| 4,554,543 A * | 11/1985 | Wyatt et al. | |
| 4,595,160 A | 6/1986 | Santos | |
| 4,598,885 A | 7/1986 | Waitzman | |
| 4,702,441 A | 10/1987 | Wang | |
| 4,714,215 A * | 12/1987 | Jupp et al. | |
| 4,722,499 A | 2/1988 | Klug | |

(Continued)

FOREIGN PATENT DOCUMENTS

DE            2149956            4/1973

(Continued)

*Primary Examiner*—Tien Dinh
(74) *Attorney, Agent, or Firm*—W. F. Fasse; W. G. Fasse

(57) ABSTRACT

To control and particularly steepen the landing glide path of an aircraft, a respective aerodynamic component mounted on each wingtip includes a fixed plane member and a pivotable control element pivotally connected to the fixed plane member. The pivot axis is perpendicular to the major plane of the wing. The pivotable control element can be selectively pivotally deflected about the pivot axis relative to the fixed plane member, so as to thereby increase the overall drag without influencing the overall lift of the aircraft. This achieves a fine adjustment that is superimposed on the basic landing configuration established by the setting of the flaps, spoilers, engine thrust, etc. By increasing the drag without influencing the lift, this steepens the landing glide path slope.

23 Claims, 2 Drawing Sheets

U.S. PATENT DOCUMENTS

| | | | |
|---|---|---|---|
| 4,784,353 A * | 11/1988 | Sigalla | 244/91 |
| 5,060,889 A * | 10/1991 | Nadkarni et al. | |
| 5,417,385 A * | 5/1995 | Arnold et al. | 244/1 A |
| 5,542,625 A * | 8/1996 | Burhans et al. | 244/45 R |
| 5,702,071 A * | 12/1997 | Kroll et al. | |
| 5,988,563 A * | 11/1999 | Allen | 244/49 |
| 5,992,793 A | 11/1999 | Perry et al. | |
| 6,076,767 A | 6/2000 | Farley et al. | |
| 6,161,797 A * | 12/2000 | Kirk et al. | |
| 6,345,790 B1 | 2/2002 | Brix | |
| 6,394,397 B1 * | 5/2002 | Ngo et al. | |
| 2004/0155146 A1 | 8/2004 | Wyrembek et al. | |
| 2004/0169110 A1 | 9/2004 | Wyrembek et al. | |

FOREIGN PATENT DOCUMENTS

| | | | |
|---|---|---|---|
| DE | 3242584 | 5/1984 | |
| DE | 3621800 | 1/1988 | |
| FR | 921155 * | 1/1947 | 244/91 |
| GB | 2051706 | 1/1981 | |
| GB | 1584348 | 2/1981 | |
| JP | 1-285492 | 11/1989 | |

\* cited by examiner

METHOD AND DEVICE FOR STEEPENING A LANDING APPROACH OF AN AIRCRAFT

PRIORITY CLAIM

This application is based on and claims the priority under 35 U.S.C. §119 of German Patent Application 101 60 315.0, filed on Dec. 7, 2001, the entire disclosure of which is incorporated herein by reference.

FIELD OF THE INVENTION

The invention relates to an arrangement of control elements and an associated method for controlling the landing approach of an aircraft by a controlled descent along a glide path.

BACKGROUND INFORMATION

A sharp increase in air traffic in recent years has led to a high utilization and partially an overloading of the air traffic capacity of many airports. Without expanding the physical runway facilities and the like of existing airports, or building new airports, a further increase in capacity can only be achieved by reducing the time required for the take-off and landing of each aircraft. Reducing the time required for the take-off of an aircraft basically requires an increase in the power of the aircraft, and is thus complicated and costly. Reducing the overall time required for the landing of an aircraft must consider that the landing process includes several phases, for example the gliding approach and descent along a glide path, flaring from the glide path to an essentially level final landing path, and finally floating or settling out to the touch down point, and then rolling out and braking along the runway. This landing process is initiated already at a considerable distance and time out from the destination airport, by a controlled descent on the so-called glide path or glide slope. Since the gliding descent along the glide path takes up a substantial amount of the total time of the overall landing process, reducing the time required for this gliding descent will have a substantial impact on shortening the overall time required for the landing process, thereby reducing the total landing and take-off cycle time, and increasing the landing capacity per hour of the airport.

The descent of the aircraft along the glide path or glide slope is controlled by the relationship of lift and drag of the aircraft. In this context, the coefficient of lift of the aircraft is dependent on the angle of attack or incidence of the aircraft as well as the incident flow velocity of the relative wind with respect to the aircraft. Modern conventional aircraft use their typical control surfaces or control elements, such as flaps, rudder, spoilers, etc. and adjustments of the propulsion engine thrust, to control the descent of the aircraft along the glide path. Unfortunately, these conventional control elements can only achieve a variation of the lift and of the aerodynamic drag in a mutually coupled manner. In other words, any adjustment of the conventional control elements will simultaneously influence both the total lift and the total drag of the aircraft. This means that an intended change of the glide path slope for a given angle of attack of the aircraft by means of a drag variation (e.g. by extending the flaps or deflecting the spoilers) will simultaneously cause a change of the lift. The resulting compound effects of any control adjustment are thus rather complex, and consequently require rather complex systems for controlling the adjustments of the control elements, and substantially limit the possibility of any further reductions in the time or distance required for the landing approach of the aircraft.

SUMMARY OF THE INVENTION

In view of the above, it is an object of the invention to provide a device and a method for improving the control of a landing approach of an aircraft, and particularly for reducing the time and distance required for the descent and landing phase of the flight of an aircraft by achieving a steeper glide path. The invention further aims to avoid or overcome the disadvantages of the prior art, and to achieve additional advantages as apparent from the present specification. The attainment of these objects is, however, not a required limitation of the invention.

The above objects have been achieved according to the invention in a device for controlling the landing approach of an aircraft, including a respective pivotable control element arranged respectively at the outboard wingtip of each wing of the aircraft. These pivotable control elements can be selectively pivoted to deflected positions, whereby the coefficient of lift of the aircraft is not influenced (i.e. remains essentially constant with no practically significant change), the coefficient of drag of the aircraft is altered, and the aerodynamic drag or flow resistance of the aircraft is increased. As a result, the glide path angle is made steeper, i.e. increased relative to the horizontal plane. Preferably, each pivotable control element is pivotally connected to a fixed plane or surface member, which in turn is rigidly connected to or a part of an aerodynamic component that is secured to the respective wingtip. The aerodynamic component may, for example, be embodied as a wingtip fence or a winglet, which is additionally provided with the pivotable control element. The pivot axis preferably extends perpendicularly to the major plane of the wing or parallel to the yaw axis of the aircraft.

The above objects have further been achieved according to the invention in a method of operating the inventive device, whereby the respective pivotable control elements on the wingtips of the two wings of the aircraft are pivotally deflected, mirror symmetrically in unison, so as to increase the total coefficient of drag, without exerting a net yaw influence on the aircraft and without influencing the total coefficient of lift. Thus, the pivotal deflection of the inventive control elements simply introduces an increased drag to the overall aerodynamic configuration of the aircraft, which thereby achieves a faster descent along a steeper glide path in a simply and finely controllable manner. Particularly, the pivotal deflection of the inventive control elements achieves a fine adjustment that is superimposed on the basic aerodynamic configuration of the aircraft that is set by the control adjustments of the general control surfaces or control elements such as the flaps, spoilers, engine thrust adjustment, etc. Furthermore, by carrying out rapid fluctuating deflections with a time varying deflection angle or magnitude of the pivotable control elements, a rapid collapse of the wingtip vortices can be achieved.

By making the gliding descent of the aircraft steeper and faster over a shorter horizontal distance along the glide path, the invention reduces the total time required for a landing process, and thereby increases the take-off and landing cycle time and throughput capacity of the airport. Moreover, the invention makes it possible to carry out a finely adjustable drag control of the aircraft with a large bandwidth or large range of control, while being essentially independent of the lift and other moments of the aircraft. The inventive control further makes it possible to reduce the flight noise of the aircraft, especially in the landing configuration.

It is especially advantageous according to the invention, that the inventive pivotable control elements can be retro-fitted onto previously existing aerodynamically effective components on the wingtips of an aircraft, having various forms and sizes, such as winglets, wingtip fences, or the like, for example. The inventive control elements can be readily adapted to the optimized wingtip element configurations required for cruise flight and/or a take-off configuration, in connection with various structural embodiments of the wingtip fences, winglets, or the like. Moreover, the inventive pivotable control elements can be moved or pivoted in various different conventionally known ways using any conventionally known mechanisms, for example, by means of hydraulic, mechanical, electromechanical, or other actuators.

The aerodynamic effect of the inventive control elements can be determined by model tests and measurements in a wind tunnel, whereby the determined test data can be used as the basis for integrating the inventive control elements into the overall flight control system of the aircraft. In other words, by providing the appropriate data that associates the control element deflection with the resulting aerodynamic effect thereof, the pivoting deflection of the inventive control elements can be readily controlled from the general flight control system of the aircraft, e.g. including a flight control computer. It is further advantageous, that the movable control elements can be controlled in a symmetrical and synchronized manner to achieve the above described glide path control without any yaw effect, but alternatively can be deflected independently and/or asymmetrically on the two sides of the aircraft so as to achieve a yaw control. This effect is especially advantageous in emergency situations such as an emergency descent of the aircraft and/or in the event of an engine failure, to support and supplement the other conventional control devices for maintaining the yaw control of the aircraft.

Appropriate actuation of the inventive pivotable control elements contributes to a rapid collapse of the trailing vortices of the wingtips of the aircraft. This is especially advantageous because then a shorter spacing (in time and distance) may be maintained between a respective aircraft taking off or landing and the next successive aircraft that can take-off or land, in view of the rapid collapse of the trailing vortices of the preceding aircraft. Thereby, a further increase of the take-off and landing rate can be achieved.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
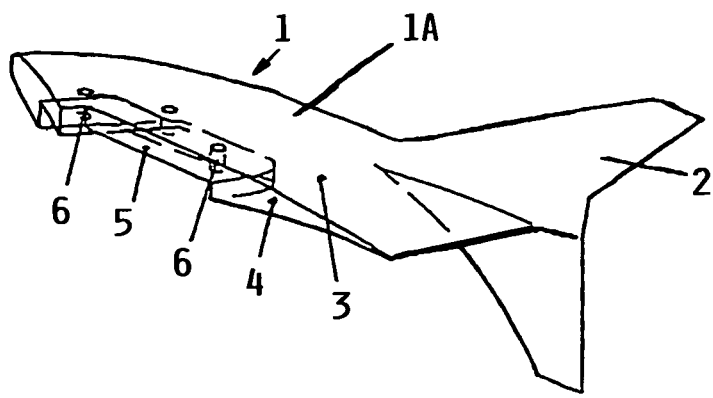
FIG. 1 is a schematic perspective view of a first embodiment of an aerodynamic component including an inventive pivotable control element, to be mounted on the wingtip of an aircraft wing.
Figure 4:
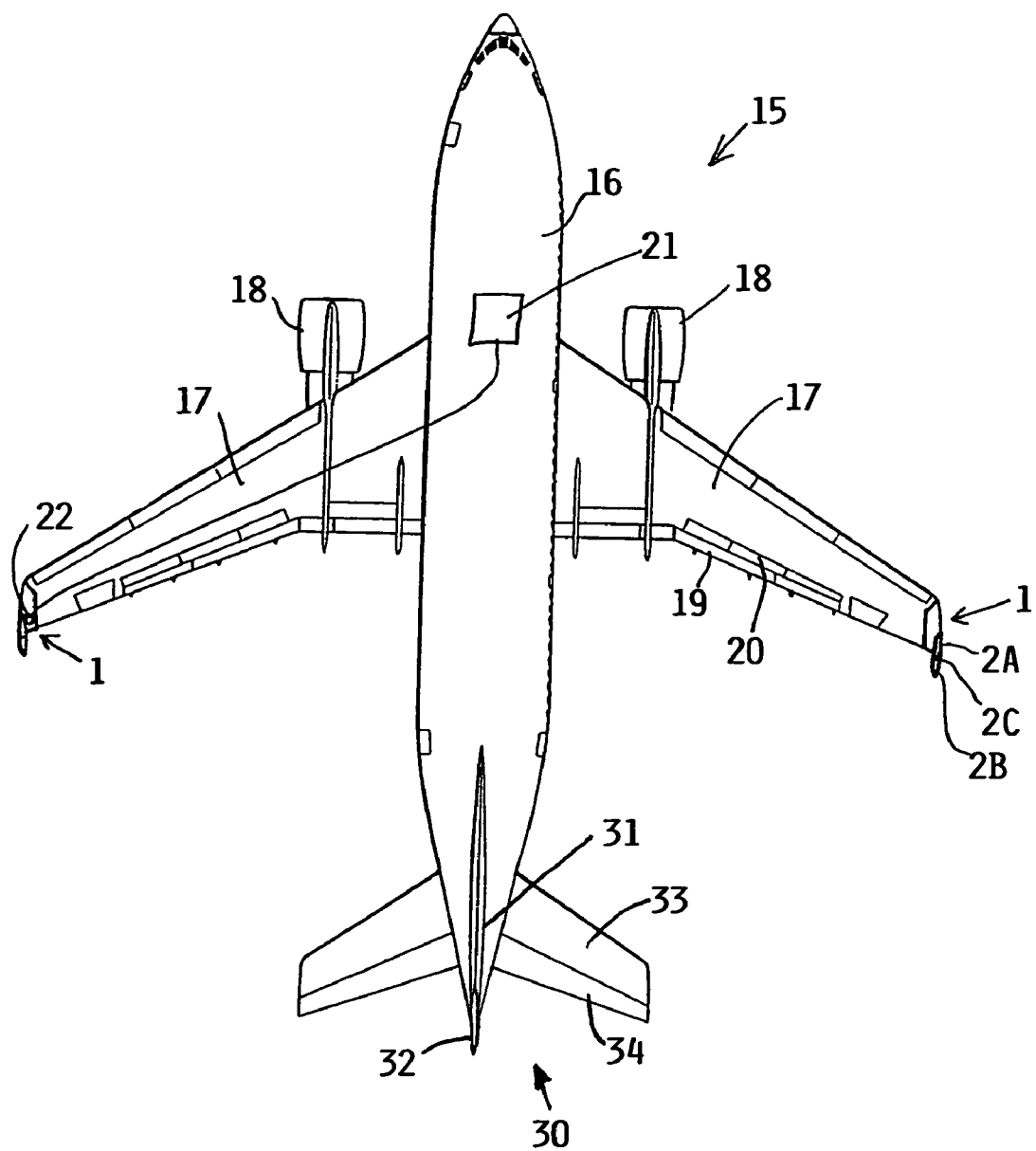
FIG. 4 is a schematic top plan view of an exemplary aircraft equipped with the inventive aerodynamic components on the wingtips thereof.

As shown in FIG. 1, an aerodynamic component 1 according to the invention is generally surfacially extending and aerodynamically contoured and is adapted to be connected to each respective outboard wingtip of a wing 17 of an aircraft 15, as generally shown in FIG. 4. The aerodynamic component 1 includes a main plane body 1A that is rigid and adapted to be fixed to the wingtip of the aircraft wing 17 with the main plane body 1A extending aerodynamically smoothly and continuously from the wingtip of the aircraft wing 17 and along the major plane of the wing 17 (e.g. the plane extending along both the leading edge and the trailing edge of the wing 17).

The aerodynamic component 1 further comprises a control surface member 2 that also has a generally surfacially extending or planar and aerodynamically contoured configuration. The control surface member 2 is connected and smoothly transitions to the main plane body 1A. Preferably, the plane of the control surface member 2 stands at a relatively steep angle (e.g. greater than 70°) and preferably perpendicularly relative to the plane of the main plane body 1A. Thus, the control surface member 2 extends along a plane that is parallel to the longitudinal axis and orthogonal to the pitch axis of the aircraft.

Figure 2:
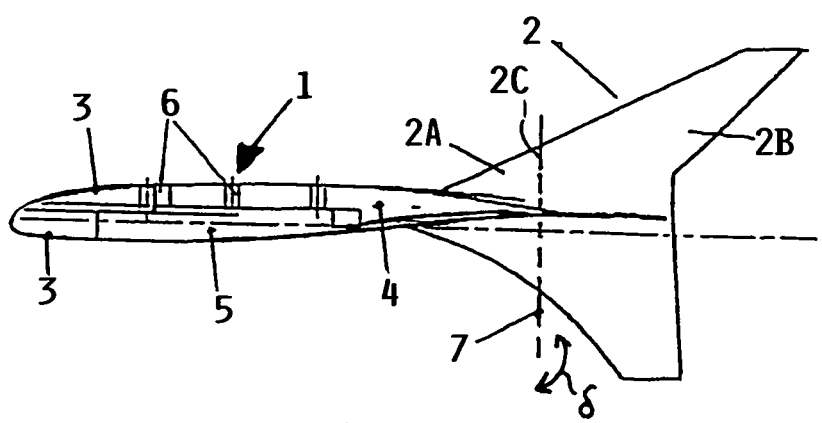
FIG. 2 is a schematic side view of the device according to FIG. 1.

As can be seen in the perspective view of FIG. 1, and especially in the side view of FIG. 2, the control surface member 2 has an elevation shape that generally comprises a delta or whale-tail shape, preferably with a further swept-back wing-like or fin-like portion that protrudes rearwardly from the delta-shaped portion. The control surface member 2 may generally be configured as a so-called wingtip fence or a winglet, or any other conventionally known aerodynamic structure to be arranged on the wingtip of an aircraft wing.

To facilitate the mounting and connection of the aerodynamic component 1 on the wingtip of the aircraft wing, the particular embodiment shown in FIGS. 1 and 2, which has been tested in wind tunnel measurements, has a side wall or edge 4 that extends substantially vertically and perpendicularly relative to the upper and lower outer surfaces 3 of the aerodynamic component 1, with a groove-shaped recess 5 let into this side wall 4 to reach into the main plane body 1A of the aerodynamic component 1. The recess 5 is adapted to receive the surfacially shaped wingtip or a suitably shaped portion of the wingtip, of an aircraft wing 17. Furthermore, throughholes 6 are provided in the main plane body 1A, such that threaded bolts or the like (not shown) can be insert through the throughholes 6 so as to mechanically secure the aerodynamic component 1 to the wingtip inserted in the recess 5. These features are merely exemplary, and can be readily adapted to various different configurations and forms of mechanical connection, as needed in any particular application, for mounting and securely fastening the aerodynamic component 1 on the wingtip of any given aircraft wing 17.

As shown particularly in the side view of FIG. 2, the control surface member 2 comprises two surface portions or plane members 2A and 2B, namely a fixed plane member 2A and a movable or pivotable plane member 2B, which represents the pivotable control element 2B according to the invention. The pivotable plane member or control element 2B is pivotably connected to the fixed plane member 2A by means of a pivot hinge or pivot joint 2C, that provides a pivot axis 7. In turn, the fixed plane member 2A is rigidly and fixedly secured to the main plane body 1A of the aerodynamic component 1, which is rigidly and fixedly secured to the wingtip as described above.

Not shown in the drawings are the actuator, linkage, and other mechanisms by which the pivotable plane member or control element 2B can be selectively pivotably deflected about the pivot axis 7 relative to the fixed plane member 2A. Any conventionally known actuators and linkages may be used in this regard, and may, for example, be housed internally within the aerodynamic component 1, or in the aircraft wing 17 itself, with merely an actuating linkage extending from the wing 17 into the aerodynamic component 1 for actuating the pivotable plane member or control element 2B. In a neutral non-deflected position extending parallel to the plane of the fixed plane member 2A, the pivotable plane member or control element 2B has a deflection angle $\delta=0°$. From this neutral position, the control element 2B can be selectively deflected, either outboard or inboard, in an infinitely adjustable stepless manner, or in preselectable steps, to a maximum deflection angle $\delta>0°$. Particularly, the maximum angular deflection, as well as any selectable deflection steps in the angular range, are determined by wind tunnel measurements for a given application.

Figure 3:
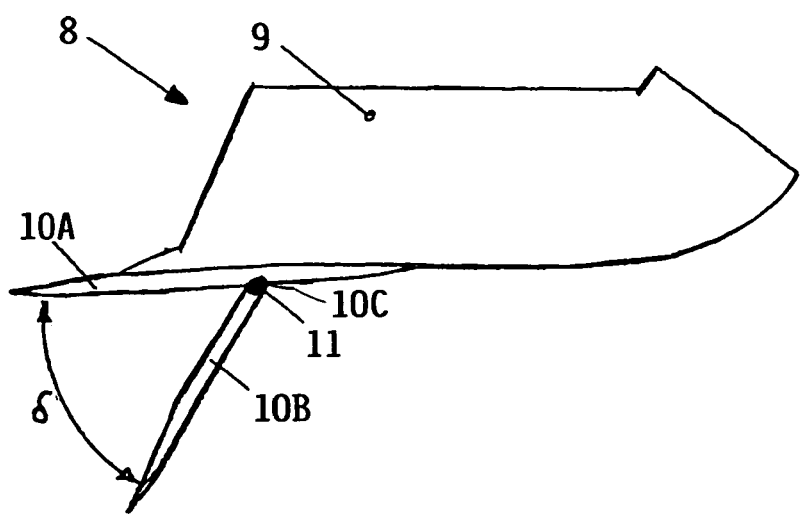
FIG. 3 is a schematic top plan view of a second embodiment of an aerodynamic component incorporating a pivotable control element according to the invention.

FIG. 3 shows a second example embodiment of an aerodynamic component 8 according to the invention. This aerodynamic component 8 generally corresponds to the above described aerodynamic component 1, except for the following differences. In the embodiment of FIG. 2, the fixed plane member 2A extends rearwardly only to the pivot joint or hinge 2C, while the pivotable plane member 2B extends forwardly only up to the pivot hinge 2C. In contrast, in the embodiment of FIG. 3, a fixed plane member 10A extends rearwardly from the pivot joint or hinge 10C adjacently along a pivotable plane member 10B. Namely, the overall control surface member 10 is "split" along its longitudinal vertical center plane, to include the fixed plane member 10A and the pivotable plane member 10B extending adjacently along one another. The pivotable plane member or control element 10B is connected to the fixed plane member 10A along the pivot hinge 10C providing a pivot axis 11 allowing the pivotable plane member to pivot by the angle $\delta$. In this embodiment, the fixed plane member 10A is the inboard member located closer to the wingtip, while the pivotable plane member 10B is the outboard member located farther away from the wingtip, and being outwardly pivotable about the pivot axis 11 by the variable or selectable deflection angle $\delta$. As mentioned above in connection with FIGS. 1 and 2, the deflection angle can be infinitely continuously adjustable, or adjustable to preselected steps, whereby these deflection angles are determined by wind tunnel tests, for example.

To ensure that the aerodynamic effect of the deflection of the pivotable plane members 2B or 10B essentially only influences the overall coefficient of drag without significantly influencing the overall coefficient of lift of the aircraft 15, the pivot axes 7 and 11 are preferably perpendicular to the major plane of the wing or parallel to the yaw axis of the aircraft. Also, the pivotable control elements 2B, 10B can be actuated independently of the other control surfaces of the aircraft, such as the spoilers, flaps, and the like, used for setting the basic landing configuration.

The respective pivotable control element 10B may be pivotally deflected outwardly away from the aircraft, while the pivotable control element 2B may be pivoted selectively either outwardly away from the aircraft or inwardly toward the aircraft, whereby the deflection of the control element 2B, 10B on the right wingtip is carried out symmetrically and in unison with the deflection of the corresponding control element 2B, 10B on the left wingtip for achieving a fine adjustment of the drag without inducing any yaw effect. This is the control situation used for steepening the landing approach glide. Alternatively, the left and right control elements 2B, 10B can be independently actuated by the aircraft flight control system, to purposely influence the yaw attitude of the aircraft in special situations.

FIG. 4 schematically shows the inventive aerodynamic components 1 respectively mounted on the outboard wingtips of the two wings 17 extending outwardly from the opposite sides of the fuselage 16 of the aircraft 15. The aircraft 15 further includes engines 18, as well as flaps 19 and spoilers 20 provided on the wings 17, whereby the control settings of these components establish the basic setting of the lift and drag for the landing glide configuration. The fine adjustment of the drag achieved by the pivotal deflection of the inventive control elements 2B is superimposed on the basic setting of the landing glide configuration. A flight controller 21 including a flight control computer of the aircraft 15 is connected to provide control signals to actuators 22 that pivotally deflect the control elements 2B responsive to the control signals provided by the flight controller 21. The aircraft 15 further includes a conventional tail unit 30 with a vertical stabilizer fin 31, a vertical rudder 32, a horizontal stabilizer 33, and elevators 34, as further shown in FIG. 4.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft including a fuselage, a, tail unit having a vertical stabilizer fin and a vertical rudder extending aft from said fuselage, two wings protruding laterally from opposite sides of said fuselage, and two aerodynamic components arranged respectively on outboard wingtips of said two wings,
    an improvement wherein said aerodynamic components comprise control means including selectively pivotable control elements for selectively varying a coefficient of drag of said aircraft without varying a coefficient of lift of said aircraft and without exerting a net yaw influence on said aircraft by selectively pivotally deflecting said selectively pivotable control elements.

2. In an aircraft including a fuselage, a tail unit having a vertical stabilizer fin and a vertical rudder extending aft from said fuselage, two wings protruding laterally from opposite sides of said fuselage, and two aerodynamic components arranged respectively on outboard wingtips of said two wings,
    an improvement wherein each one of said aerodynamic components respectively comprises a selectively pivotable control element that is selectively pivotable about a pivot axis arranged and oriented so that a pivoting deflection of said control element about said pivot axis influences a coefficient of drag of said aircraft and does not influence a coefficient of lift of said aircraft, and wherein a simultaneous pivoting deflection of said control elements about said pivot axes does not exert a net yaw influence on said aircraft.

3. The improvement in the aircraft according to claim 2, wherein each said control element is a respective pivotable plane member.

4. The improvement in the aircraft according to claim 3, wherein said pivotable plane member has a side elevation shape that comprises a delta shape.

5. The improvement in the aircraft according to claim 4, wherein said side elevation shape further comprises a back-swept fin shape protruding rearwardly from said delta shape.

6. The improvement in the aircraft according to claim 3, wherein each one of said aerodynamic components respectively further comprises a fixed plane member that is arranged fixedly and rigidly relative to said wing, and a pivot joint that pivotably connects said pivotable plane member to said fixed plane member along said pivot axis.

7. The improvement in the aircraft according to claim 6, wherein said fixed plane member extends only forwardly from said pivot joint, and said pivotable plane member extends only rearwardly from said pivot joint.

8. The improvement in the aircraft according to claim 6, wherein said fixed plane member and said pivotable plane member both extend rearwardly from said pivot joint side-by-side adjacent to one another.

9. The improvement in the aircraft according to claim 6, wherein each one of said aerodynamic components respectively further comprises a main plane body that is secured fixedly to and extends in an outboard direction from said wingtip along a major plane of said wing, and wherein said fixed plane member is joined fixedly and rigidly to said main plane body.

10. The improvement in the aircraft according to claim 9, wherein said fixed plane member protrudes from said main plane body and extends along a control element plane that is perpendicular to said major plane of said wing.

11. The improvement in the aircraft according to claim 10, wherein said pivotable plane member in a neutral non-deflected position also extends along said control element plane.

12. The improvement in the aircraft according to claim 9, wherein said main plane body has a recess in a lateral side wall thereof, and at least a portion of said wingtip is received and secured in said recess.

13. The improvement in the aircraft according to claim 2, wherein each said pivot axis is oriented perpendicular to a major plane of said wing.

14. The improvement in the aircraft according to claim 2, wherein each said pivot axis is oriented parallel to a yaw axis of said aircraft.

15. The improvement in the aircraft according to claim 2, wherein each one of said aerodynamic components respectively further comprises a previously existing aerodynamic member provided on said wingtip, and wherein said pivotable control element is retrofitted onto said previously existing aerodynamic member by being pivotably connected thereto.

16. The improvement in the aircraft according to claim 2, wherein said aircraft further includes a flight control system, and further comprising a respective actuator mechanically coupled to each respective one of said pivotable control elements of said aerodynamic components to selectively pivot said control elements respectively about said pivot axes, and wherein said actuators are connected to said flight control system to receive control signals therefrom so as to pivotally deflect said control elements about said pivot axes to influence said coefficient of drag without influencing said coefficient of lift and without exerting said net yaw influence on said aircraft.

17. A method of performing a controlled landing approach of an aircraft including a fuselage, a tail unit having a vertical stabilizer fin and a vertical rudder extending aft from said fuselage, two wings protruding laterally from opposite sides of said fuselage, and two aerodynamic components arranged respectively on outboard wingtips of said two wings, wherein each one of said aerodynamic components respectively comprises a selectively pivotable control element that is selectively pivotable about a pivot axis arranged and oriented so that a pivoting deflection of said control element about said pivot axis influences a coefficient of drag of said aircraft and does not influence a coefficient of lift of said aircraft, said method comprising the steps:
  a) flying said aircraft in a landing approach by descending said aircraft along a glide path;
  b) setting a major descent characteristic of said aircraft along said glide path by setting at least one of flaps, spoilers, and engine thrust of said aircraft to a respective selected setting, wherein said major descent characteristic includes an overall coefficient of lift and an overall coefficient of drag of said aircraft; and
  c) pivotally deflecting said pivotable control elements to achieve a fine adjustment that is superimposed on said major descent characteristic by increasing said overall coefficient of drag without changing said overall coefficient of lift and without causing a net yaw influence on said aircraft, whereby a descent angle of said glide path is made steeper with said fine adjustment than without said fine a justment.

18. The method according to claim 17, wherein said step c) comprises deflecting said pivotable control elements mirror symmetrically in unison respectively on said wingtips of said two wings on said opposite sides of said fuselage.

19. The method according to claim 17, further comprising temporarily and rapidly pivotally deflecting said pivotable control elements in a fluctuating manner with time-varying deflection magnitudes, so as to thereby expedite collapsing of wingtip vortices generated by said Wiflgtips.

20. In an aircraft including a fuselage, a tail unit having a vertical stabilizer fin and a vertical rudder extending aft from said fuselage, two wings protruding laterally from opposite sides of said fuselage, and two aerodynamic components arranged respectively on outboard wingtips of said two wings,
  an improvement wherein each one of said aerodynamic components respectively comprises a main plane body that is secured fixedly to and extends in an outboard direction from said wingtip, a fixed plane member that is joined fixedly and rigidly to said main plane body and extends perpendicularly relative to said main plane body, a pivotable plane member, and a pivot joint that pivotably connects said pivotable plane member with said fixed plane member along a pivot axis so that said pivotable plane member is selectively pivotably deflectable relative to said fixed plane member about said pivot axis, wherein said pivot axis is oriented perpendicular to a major plane of said wing so that pivoting deflections of said pivotable plane members of said aerodynamic components about said pivot axes thereof influence a total coefficient of drag of said aircraft and do not influence a total coefficient of lift of said aircraft and do not exert a net yaw influence on said aircraft.

21. The improvement in the aircraft according to claim 20, further comprising a controller connected and adapted to control said pivotable plane members of said aerodynamic components symmetrically with one another so that said pivoting deflection of said pivotable plane members causes no net yaw influence on said aircraft.

22. In an aircraft including a fuselage, a, tail unit having a vertical stabilizer fin and a vertical rudder extending aft from said fuselage, two wings protruding laterally from opposite sides of said fuselage, and two aerodynamic components arranged respectively on outboard wingtips of said two wings, an improvement wherein each one of said aerodynamic components respectively comprises a fixed plane member that is arranged fixedly and rigidly relative to a respective one of said wings, a pivot joint that defines a pivot axis, and only a single selectively pivotable plane member that is arranged on only one side of said fixed plane member and is pivotably connected to said fixed plane member by said pivot joint along said pivot axis, wherein said fixed plane member and said pivotable plane member both extend rearwardly from said pivot joint side-by-side adjacent to one another, and wherein said pivotable plane members of said aerodynamic components are selectively pivotable about said pivot axes thereof which are arranged and oriented so that pivoting deflections of said pivotable plane members about said pivot axes influence a coefficient of drag of said aircraft and do not influence a coefficient of lift of said aircraft and do not exert a net yaw influence on said aircraft.

23. The improvement in the aircraft according to claim 22, further comprising a controller connected and adapted to control said pivotable plane members of said aerodynamic components symmetrically with one another so that said pivoting deflection of said pivotable plane members causes no net yaw influence on said aircraft.

* * * * *

UNITED STATES PATENT AND TRADEMARK OFFICE
CERTIFICATE OF CORRECTION

PATENT NO.        : 7,316,371 B2
APPLICATION NO.   : 10/313052
DATED             : January 8, 2008
INVENTOR(S)       : Wyrembek et al.

It is certified that error appears in the above-identified patent and that said Letters Patent is hereby corrected as shown below:

Column 4,
Line 50, after "can be", replace "insert" by --inserted--;

Column 6,
Line 36, after "fuselage, a", delete ",";

Column 8,
Line 26, after "fine", replace "a justment" by --adjustment--;
Line 36, after "said", replace "Wiflgtips" by --wingtips--;

Column 9,
Line 1, after "fuselage, a", delete ",".

Signed and Sealed this

Tenth Day of March, 2009

JOHN DOLL
*Acting Director of the United States Patent and Trademark Office*